United States Patent
Jing et al.

(10) Patent No.: US 6,301,304 B1
(45) Date of Patent: Oct. 9, 2001

(54) ARCHITECTURE AND METHOD FOR INVERSE QUANTIZATION OF DISCRETE COSINE TRANSFORM COEFFICIENTS IN MPEG DECODERS

(75) Inventors: Tai Jing, Mountain View; Surya Varanasi, Tracy, both of CA (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/098,657

(22) Filed: Jun. 17, 1998

(51) Int. Cl.$^7$ ....................................................... H04N 7/12
(52) U.S. Cl. ........................................................ 375/240.25
(58) Field of Search ........................ 375/240.01, 240.03, 375/240.12, 240.16, 240.2, 240.23, 240.24, 240.25; H04N 7/12

(56) References Cited

U.S. PATENT DOCUMENTS

| 5,809,245 | 9/1998 | Zenda . |
| 5,889,515 | 3/1999 | McDade et al. . |

OTHER PUBLICATIONS

Hung et al. "Statistical Inverse Discrete Cosine Transforms for Image Compression," SPIE Vo. 2187, pp. 196–205, Apr. 1994.

Arai et al., "A Fast DCT–SQ Scheme for Images," The Transactions of the IEICE, vol. E 71, No. 11, Nov. 1988, 1095–1097.

*Primary Examiner*—Young Lee

(57) ABSTRACT

An inverse quantizer is provided with a reduced bit-width. In one embodiment, the inverse quantizer receives quantized DCT coefficients in sign+magnitude form with 1+11 bits of resolution, and produces reconstructed DCT coefficients with 1+11 bits of resolution. Although this is less than the theoretical minimum bit-width required to represent the entire reconstructed DCT coefficient range [−2048, 2047] mandated by the MPEG standard, certain IDCT implementations will maintain IEEE compliance when the −2048 value is replaced with −2047. (An example of one such implementation is provided in a co-pending application.) This reduces the range to [−2047, 2047]. In one embodiment, the inverse quantizer includes a dead-zone expander, a quantization multiplier, a mismatch controller, and a bit-width reducer. The dead-zone expander receives quantized coefficients with 1+11 bits of resolution, doubles them, and then increases their magnitude by one. The quantization multiplier multiplies the result by a 15 bit quantization matrix scale factor to produce reconstructed DCT coefficients. The mismatch controller modifies least significant bits of DCT coefficients according to the MPEG standard and limits the range of values for the DCT coefficients. Finally, the bit-width reducer converts the DCT coefficient representation to 1+11 bits.

7 Claims, 6 Drawing Sheets

ARCHITECTURE AND METHOD FOR INVERSE QUANTIZATION OF DISCRETE COSINE TRANSFORM COEFFICIENTS IN MPEG DECODERS

BACKGROUND OF THE INVENTION

1. Field of the Invention

This invention relates to the field of video compression, and in particular to a video decoder which provides fully IEEE compliant MPEG decoding with a reduced complexity architecture.

2. Description of the Related Art

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (from imperceptible to severe image degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a reference frame or anchor frame, generally in a moderately compressed format. Successive frames are compared with the anchor frame, and only the differences between the anchor frame and the successive frames are stored. Periodically, such as when new scenes are displayed, new anchor frames are stored, and subsequent comparisons begin from this new reference point. It is noted that the interframe compression ratio may be kept constant while varying the video quality. Alternatively, interframe compression ratios may be content-dependent, i.e. if the video clip being compressed includes many abrupt scene transitions from one image to another, the compression is less efficient. Examples of video compression which use an interframe compression technique are MPEG, DVI and Indeo, among others.

The compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield very high compression ratios.

The two predominant MPEG standards are referred to as MPEG-1 and MPEG-2. The MPEG-1 standard generally concerns inter-field data reduction using block-based motion compensation prediction, which generally uses temporal differential pulse code modulation. The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I (intra) frames contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, P frames receive a fairly high amount of compression and are used as references for future P frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe compression technique. After the I frames have been created, the MPEG encoder divides following frames into a grid of 16×16 pixel squares called macroblocks. For a following target frame, i.e., the frame being encoded, the encoder searches for a best fit or best match between the target picture macroblock and a region in a neighboring frame, referred to as an anchor frame. For a target P frame, the encoder searches in a prior I or P frame. For a target B frame, the encoder searches in a prior and a subsequent I or P frame. When a best match is found, the encoder transmits a vector movement code or motion vector. The vector movement code or motion vector includes a pointer to the best fit region in the anchor frame as well as information on the difference between the best fit region and the respective target block. The blocks in target pictures that have no change relative to the corresponding region in the reference or search frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between the macroblock and corresponding best-fit region. Encoding the difference is accomplished through a math process referred to as the discrete cosine transform or DCT. This process divides the macroblock into four sub-blocks, seeking out changes in color and brightness. Human perception is more sensitive to brightness changes than color changes. Thus the MPEG algorithm devotes more effort to reducing color space rather than brightness.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks and respective sub-blocks, and each block is transformed via the discrete cosine transform (DCT).

After the transformed blocks are converted to the "DCT domain", each entry (i.e. DCT coefficient) in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the DCT coefficients are quantized, information is lost and errors are introduced to the reconstructed image. Run-level encoding will be used to encode the quantized DCT coefficients. This statistical encoding of the consecutive zeroed-valued coefficients corresponding to the higher-order coefficients accounts for considerable compression gain.

For I-frames, the video encoder then performs variable-length coding (VLC) on the DC data. VLC is a reversible procedure for coding data that assigns shorter code words to frequent events and longer code words to less frequent events, thereby achieving additional video compression. Huffman encoding is a particularly well-known form of VLC that reduces the number of bits necessary to represent a data set without losing any information.

For all frames, the coefficient sequence is often organized in a specified orientation termed zigzag ordering to cluster non-zero coefficients early in the series and to encode as many zero coefficients as possible following the last non-zero coefficient in the ordering. Zigzag ordering concentrates the highest spatial frequencies at the end of the series. Once the zigzag ordering has been performed, the encoder performs "run-level coding" on the AC coefficients of I-frames, and both the DC and AC coefficients for P and B-frames. Run-level coding encodes the number of zeros between non-zero coefficients (i.e. the zero run length) and the value of the following non-zero coefficient (i.e. the quantization level) into a single variable-length code word. This process reduces each 8 by 8 block of DCT coefficients to a number of events represented by a non-zero coefficient and the number of preceding zero coefficients. Because the high-frequency coefficients are more likely to be zero, zigzag ordering prior to run-level coding results in additional video compression.

The final compressed video data is then ready to be provided to a storage device or transmitted over a transmission medium for reception and decompression by a remotely located decoder. Because of the picture dependencies, i.e., the temporal compression, the order in which the frames are transmitted, stored, or retrieved, is not necessarily the display order, but rather an order required by the decoder to properly decode the pictures in the bitstream. For example, a typical sequence of frames, in display order, might be shown as follows:

| I | B | B | P | B | B | P | B | B | P | B | B | I | B | B | P | B | B | P |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 |

By contrast, the bitstream order corresponding to the given display order would be as follows:

| I | P | B | B | P | B | B | P | B | B | I | B | B | P | B | B | P | B | B |
|---|---|---|---|---|---|---|---|---|---|---|---|---|---|---|---|---|---|---|
| 0 | 3 | 1 | 2 | 6 | 4 | 5 | 9 | 7 | 8 | 12 | 10 | 11 | 15 | 13 | 14 | 18 | 16 | 17 |

Because the B frame depends on a subsequent I or P frame in display order, the I or P frame must be transmitted and decoded before the dependent B frame.

As discussed above, temporal compression makes use of the fact that most of the objects remain the same between consecutive picture frames, and the difference between objects or blocks in successive frames is their position in the frame as a result of motion (either due to object motion, camera motion or both). The key to this relative encoding is motion estimation. In general, motion estimation is an essential processing requirement in most video compression algorithms. In general, motion estimation is the task of identifying temporal redundancy between frames of the video sequence.

The video decoding process is generally the inverse of the video encoding process and is employed to reconstruct a motion picture sequence from a compressed and encoded bitstream. The data in the bitstream is decoded according to a syntax that is defined by the data compression algorithm. The decoder must first identify the beginning of a coded picture, identify the type of picture, then decode each individual macroblock within a particular picture.

When encoded video data is transferred to a video decoder, the encoded video data is received and stored in a channel buffer. The data is then retrieved from the channel buffer by a decoder or reconstruction device for performing the decoding process. When the MPEG decoder receives the encoded stream, the MPEG decoder reverses the above operations. Thus the MPEG decoder performs inverse scanning to remove the zigzag ordering, inverse quantization to de-quantize the data, and the inverse DCT to convert the data from the frequency domain back to the pixel domain. The MPEG decoder also performs motion compensation using the transmitted motion vectors to re-create the temporally compressed frames.

When frames are received which are used as references for other frames, such as I or P frames, these frames are decoded and stored in memory. When a reconstructed frame is a reference or anchor frame, such as an I or a P frame, the reconstructed frame replaces the oldest stored anchor frame and is used as the new anchor for subsequent frames.

When a temporally compressed or encoded frame is received, such as a P or B frame, motion compensation is performed on the frame using the neighboring decoded I or P reference frames, also called anchor frames. The temporally compressed or encoded frame, referred to as a target frame, will include motion vectors which reference blocks in neighboring decoded I or P frames stored in the memory. The MPEG decoder examines the motion vector, determines the respective reference block in the reference frame, and accesses the reference block pointed to by the motion vector from the memory.

In order to reconstruct a B frame, the two related anchor frames or reference frames must be decoded and available in a memory, referred to as the picture buffer. This is necessary since the B frame was encoded relative to these two anchor frames. Thus the B frame must be interpolated or reconstructed using both anchor frames during the reconstruction process.

After all of the macroblocks have been processed by the decoder, the picture reconstruction is complete. The decoded frame is stored into a frame store buffer. In some configurations, the channel and frame store buffers are incorporated into a single integrated memory buffer. A display processor retrieves the picture data for display by an appropriate display device, such as a TV monitor or the like.

The MPEG standard does not specify implementations for encoders and decoders. The system designer is free to choose among many DCT algorithms and implementations, most of which provide significant savings in computational effort by taking advantages of symmetries in the DCT. Although the various methods theoretically yield the same end result, it is often necessary to implement the methods with extended bit lengths to keep truncation errors from propagating and causing significant output errors. In IEEE Standard 1180-1990, a standard is provided for maximum allowable output error from inverse DCT implementations. It is desirable to provide video decoders with minimal implementation complexity and cost which maintain compliance with this standard.

SUMMARY OF THE INVENTION

Accordingly, there is provided herein an inverse quantizer having a reduced bit-width. In one embodiment, the inverse quantizer receives quantized DCT coefficients in sign+magnitude form with 1+11 bits of resolution, and produces reconstructed DCT coefficients with 1+11 bits of resolution. Although this is less than the theoretical minimum bit-width required to represent the entire reconstructed DCT coefficient range [−2048, 2047] mandated by the MPEG standard, certain IDCT implementations will maintain IEEE compliance when the −2048 value is replaced with −2047. (An example of one such implementation is provided in a co-pending application.) This reduces the range to [−2047, 2047]

In one embodiment, the inverse quantizer includes a dead-zone expander, a quantization multiplier, a mismatch controller, and a bit-width reducer. The dead-zone expander receives quantized coefficients with 1+11 bits of resolution, doubles them, and then increases their magnitude by one. The quantization multiplier multiplies the result by a 15 bit quantization matrix scale factor to produce reconstructed DCT coefficients. The mismatch controller modifies least significant bits of DCT coefficients according to the MPEG standard and limits the range of values for the DCT coefficients. Finally, the bit-width reducer converts the DCT coefficient representation to 1+11 bits.

BRIEF DESCRIPTION OF THE DRAWINGS

Other objects and advantages of the invention will become apparent upon reading the following detailed description and upon reference to the accompanying drawings in which.

Figure 1:
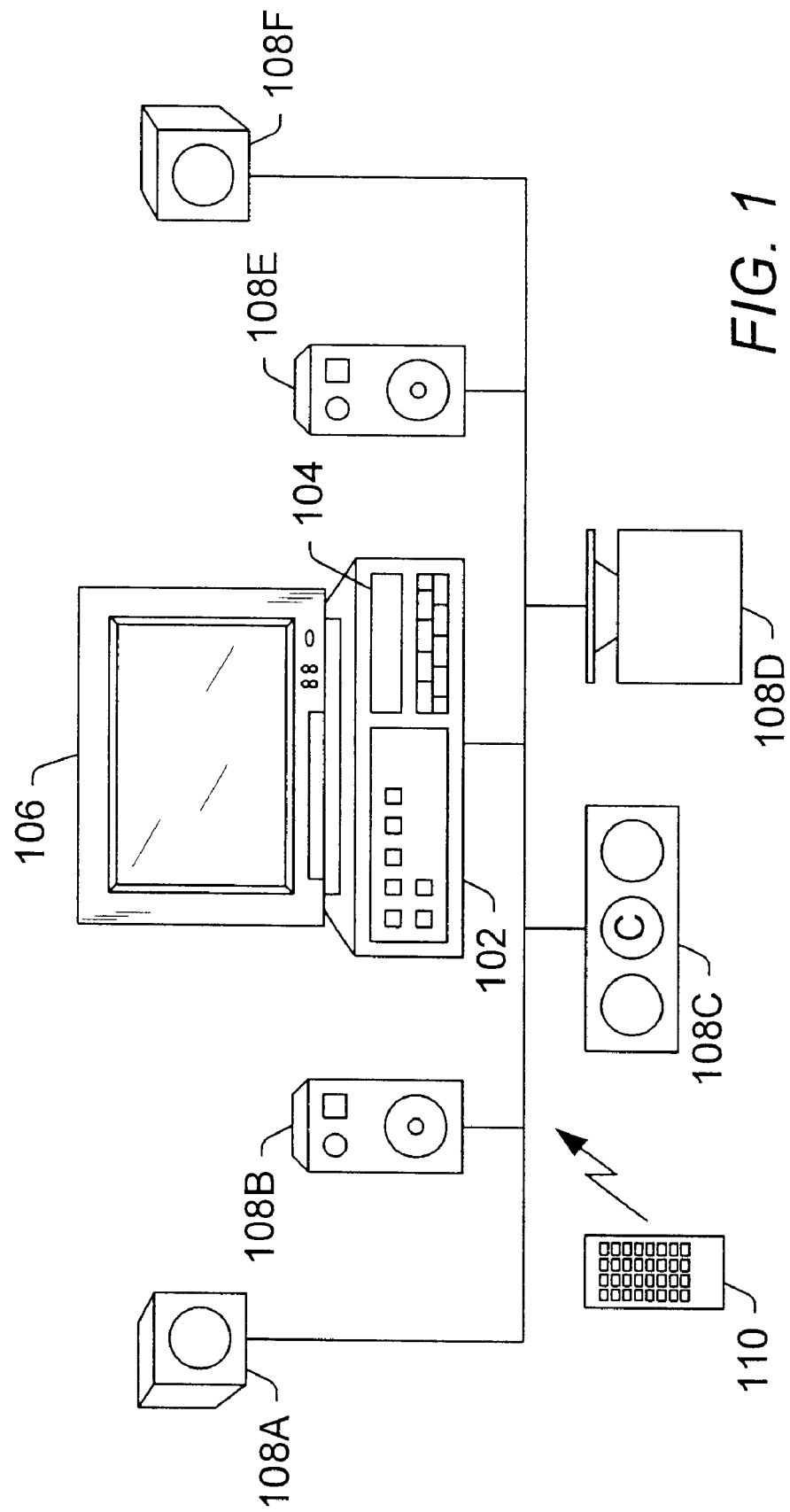
FIG. 1 shows an encoded multimedia playback device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 shows a multimedia playback device 102 which includes a multimedia disk drive 104 and is coupled to a display monitor 106, a speaker system 108, and a remote control 110. Multimedia playback device 102 includes a video decoder which is advantageously implemented using smaller, simpler components. The device 102 accepts multimedia disks in drive 104, and can read compressed multimedia bitstreams from the multimedia disk. Device 102 can decode the compressed multimedia bitstream into audio and video signals for presentation on speaker system 108 and monitor 106, respectively. Device 102 may also respond to user commands from remote control 110.

In one embodiment, multimedia drive 104 is configured to accept a variety of optically readable disks. For example, audio compact disks, CD-ROMs, DVD disks, and DVD-RAM disks may be accepted. The drive 104 can consequently read audio programs and multimedia bitstreams. The drive 104 is also configured to write multimedia bitstreams, and may additionally be configured to write audio programs. The drive 104 includes a multimedia decoder which converts read multimedia bitstreams into video displays and audio programs. The drive 104 also includes a multimedia encoder for converting video displays and audio programs into a multimedia bitstream. A user may use control 110 to instruct device 102 to present the video displays and audio programs to display monitor 106 and speaker set 108 for display and audio playback.

Figure 2:
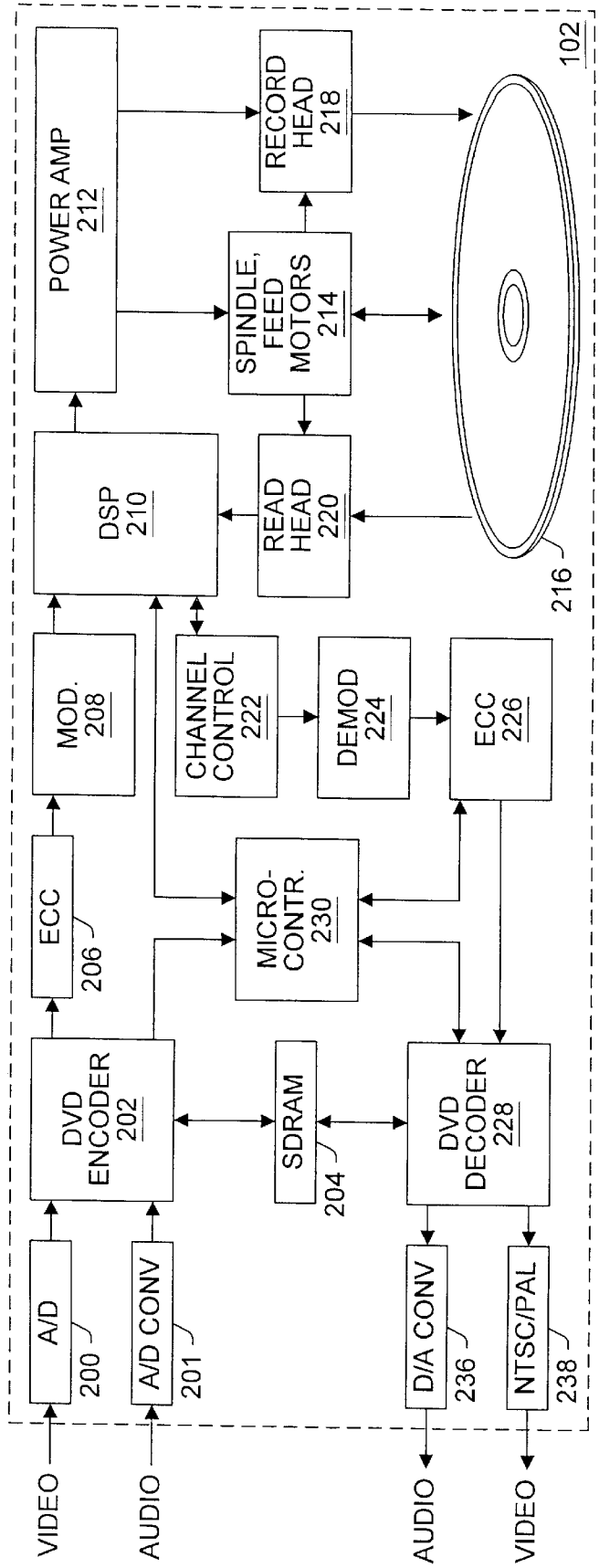
FIG. 2 is a functional block diagram of an encoded multimedia record and playback device.

Turning now to FIG. 2, a functional block diagram of a video playback device 102 is shown. The device 102 provides audio and video signals to speakers 108 and display monitor 106, and can accept audio and video signals from a television tuner or some other source. The received video and audio signals are converted to digital video and audio signals by A/D converters 200, 201. The digital audio and video bitstreams are provided to multimedia encoder 202. Multimedia encoder 202 uses synchronous dynamic random access memory (SDRAM) 204 as a frame store buffer while encoding the received signals. The resulting multimedia bitstream is processed by an error correction encoder 206 then converted to a modulated digital signal by modulator 208. The modulated digital signal is coupled to a digital signal processor (DSP) 210 and from there to a power amplifier 212. Amplified signals are coupled to drive motors 214 to spin a recordable multimedia disk 216, and to a record head 218 to store the modulated digital signal on the recordable multimedia disk 216.

Stored data can be read from the recordable multimedia disk 216 by read head 220 which sends a read signal to DSP 210 for filtering. The filtered signal is coupled to channel control buffer 222 for rate control, then demodulated by demodulator 224. An error correction code decoder 226 converts the demodulated signal into a multimedia bitstream which is then decoded by multimedia decoder 228. In decoding the multimedia bitstream, the multimedia decoder 228 produces digital audio and video bitstreams which are provided to D/A converters 236 and 238, which in turn provide the audio and video signals to display monitor 106. Video D/A 238 is typically an NTSC/PAL rasterizer for television, but may also be a RAMDAC for other types of video screens.

Multimedia encoder 202 operates to provide compression of the digital audio and video signals. The digital signals are compressed individually to form bitstreams which are then divided into packets which are inter-mixed to form the compressed multimedia bitstream. Various compression schemes may be used. Common audio compression schemes are MUSICAM, Dolby AC3, and Linear PCM. MPEG is an example of a suitable video compression scheme. DVD is a multimedia standard which combines the named audio and video compression schemes and which would serve well here.

In one embodiment, the general nature of the video compression performed by multimedia encoder 202 is MPEG encoding. The video compression may include subsampling of the luminance and chrominance signals, conversion to a different resolution, determination of frame compression types, compression of the frames, and re-ordering of the frame sequence. The frame compression may be intraframe compression or interframe compression. The intraframe compression is performed using a block discrete cosine transform with zig-zag reordering of transform coefficients followed by run length and Huffman encoding of the transform coefficients. The interframe compression is performed by additionally using motion estimation, predictive coding, and coefficient quantization.

Error correction encoder 206 and modulator 208 operate to provide channel coding and modulation for the output of the multimedia encoder 202. Error correction encoder 206 may be a Reed-Solomon block code encoder, which provides protection against errors in the read signal. The modulator 208 converts the error correction coded output into a modulated signal suitable for recording on multimedia disk 216.

DSP 210 serves multiple functions. It provides filtering operations for write and read signals, and it acts as a controller for the read/write components of the system. The modulated signal provided by modulator 208 provides an "ideal" which the read signal should approximate. In order to most closely approximate this ideal, certain nonlinear characteristics of the recording process must often be compensated. The DSP 210 may accomplish this compensation by pre-processing the modulated signal and/or post-processing the read signal. The DSP 210 controls the drive motors 214 and the record head 218 via the power amplifier 212 to record the modulated signal on the multimedia disk 216. The DSP 210 also controls the drive motors 214 and uses the read head 220 to scan the multimedia disk 216 and produce a read signal.

The channel control buffer 222 provides buffering of the read signal, while demodulator 224 demodulates the read signal and error correction code decoder 226 decodes the demodulated signal. After decoding the demodulated signal, the error correction decoder 226 forwards the decoded signal to multimedia decoder 228.

Multimedia decoder 228 operates to decode the output of the error correction decoder 226 to produce digital audio signals and video signals. The operation and structure of multimedia decoder 228 are discussed next. The digital audio signal and video signals may be converted to analog audio and video signals by D/A converter 236 and rasterizer 238 before being presented to speakers 108 and display monitor 106.

Figure 3:
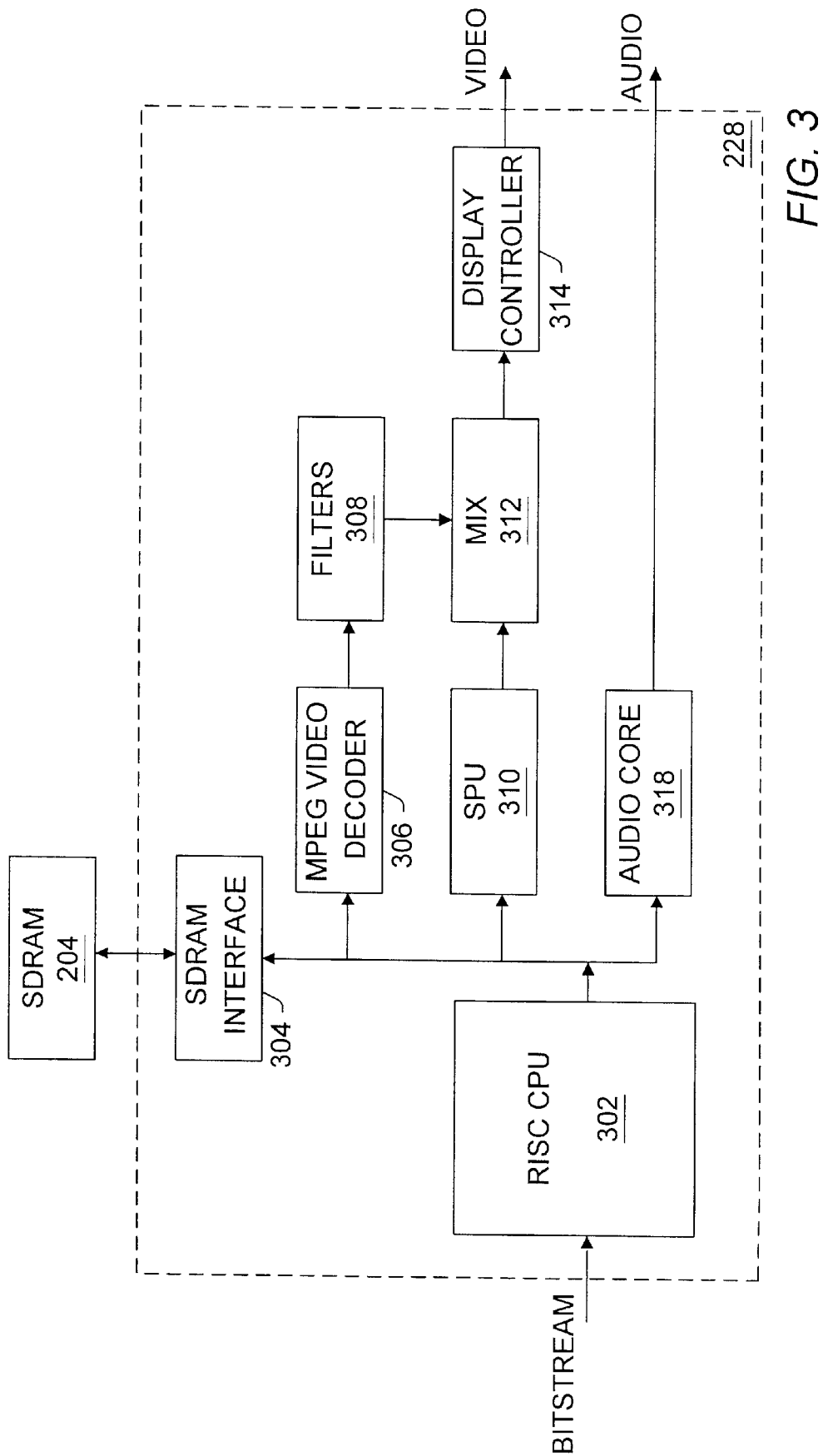
FIG. 3 is a functional block diagram of an encoded multimedia bitstream decoder.

Turning now to FIG. 3, a block diagram one embodiment of multimedia decoder 228 is shown. Multimedia decoder 228 receives an encoded multimedia bitstream. The encoded multimedia bitstream is provided to a programmable microprocessor 302 which parses the bitstream syntax, performs high-level decoding operations, routes compressed audio and video data to an appropriate buffer in memory 204 for further processing, and supervises operation of the ensuing decoder components: memory interface 304, video decoder 306, video filters 308, sub-picture unit 310, mixer 312, display controller 314, and audio decoder 318.

In one embodiment, the memory 204 is a synchronous dynamic random access memory (SDRAM) which is accessed via memory interface 304. Data routed to the video decoder buffer is decoded by video decoder 306 and the decoded image data may be filtered by filters 308. Data routed to the sub-picture unit buffer is decoded by sub-picture unit 310. The decoded SPU signal may be masked onto the filtered image by mixer 312, and subsequently routed to display controller 314. The display controller 314 synchronizes the transfer of pixel data to rasterizer 238 for display on monitor 106.

Processor 302 routes audio data to an audio buffer from which it is retrieved and decoded by audio decoder 318. The output of audio decoder 318 is coupled to audio D/A converter 236 for presentation to speakers 108.

The compressed video bitstream stored in the video buffer consists of "slices" each representing a horizontal section of an image frame. Each slice consists of a slice header and a sequence of macroblocks. The slice header contains information on the entire slice as a whole. Macroblocks may be broken up into a macroblock header, a motion vector, and coded blocks of DCT coefficients. The macroblock headers contain parameters relevant to the decoding of the macroblock. The motion vector section contains parameters which are used to determine the motion vectors for the macroblock. The DCT coefficients are extracted from the bitstream following the motion vectors. In the extraction of the motion vectors and DCT coefficients, the parameters for the macroblock header are used. More details on the MPEG1 and MPEG2 syntaxes may be found in the ISO 13818-2 specification. Most of the macroblock parameters in the compressed video bitstream are variable length code (VLC) encoded. Huffman coding is a popular VLC coding method.

Figure 4:
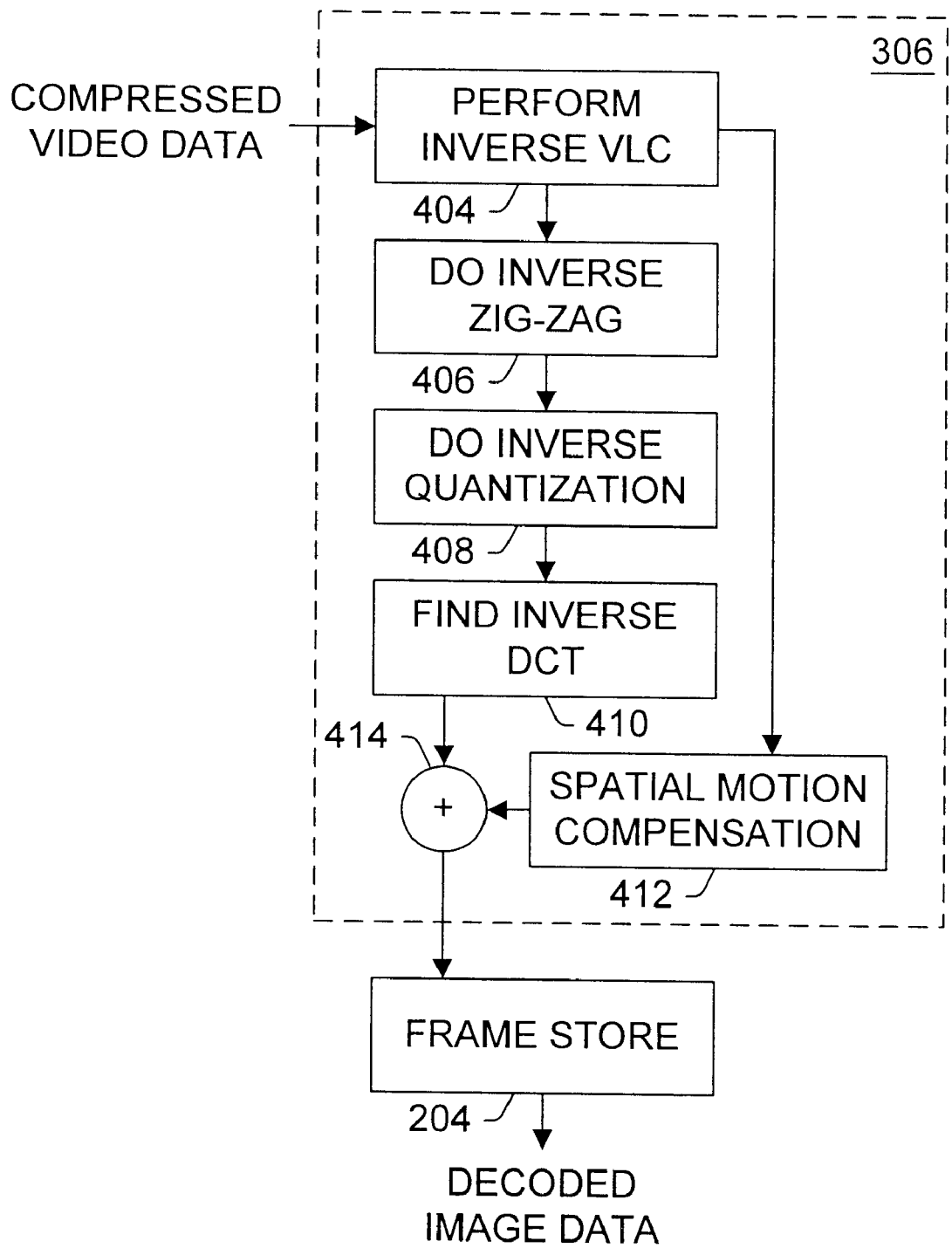
FIG. 4 is a functional block diagram of one video decoder embodiment.

Turning now to FIG. 4, a functional block diagram of video decoder 306 is shown. Video decoder 306 comprises VLC decoder block 404, inverse zigzag block 406, inverse quantization block 408, inverse DCT block 410, motion compensation block 412, and adder 414. Also shown is frame store 204. VLC decoder block 404 receives compressed video data from a video buffer in memory 204, and parses the video bitstream to perform VLC decoding. VLC decoder block 404 extracts the slice header information, the macroblock header information, the motion vector information, and the DCT coefficient information. VLC decoder block 404 provides the DCT coefficient information to inverse zigzag block 406, and the motion vector information to motion compensation block 412.

Inverse zigzag block 406 re-orders DCT coefficient information from VLC decoder block 404 to form a quantized DCT matrix, and provides the quantized DCT matrix to inverse quantization block 408. Inverse quantization block 408 receives the quantized DCT matrix and operates on the elements to obtain a decompressed DCT matrix. Inverse DCT block 410 receives the DCT matrix and performs the inverse DCT to convert the DCT matrix into an image correction block.

Motion compensation block 412 receives motion vector information which is indicative of a reference image block, and motion compensation block 412 uses the motion vector information to retrieve the reference image block from the frame store in memory 204 and thereafter provides it to adder 414. Adder 414 combines the reference image block with the image correction block to produce a decoded image block which may then be stored in the frame store.

Some implementation freedom is permitted in the MPEG standard. Although a given bitstream should reconstruct to a unique set of pictures, an occasional error in the least significant bit (LSB) is allowed. This provision is made to encourage the development of more economic implementations of MPEG decoders.

One obstacle to the development of affordable MPEG decoders resides in inverse DCT block 410. If directly implemented, the IDCT reference formula in the NPEG specification would consume at least 1024 multiply and 1024 addition operations for each 8×8 pixel block. This is excessive, particularly since a wide variety of fast algorithms exist which can reduce the number of operations per block by exploiting innate symmetries of the cosine transform. Each algorithm has its own characteristics, i.e. some are more suitable for software implementation while others are better for programmable hardware, and yet others more desirable for hardwired hardware designs. Each fast algorithm has different quantization error characteristics, and many require at least 16 bits for initial coefficients and 24 bits for intermediate product values to prevent truncation errors from propagating and growing to detectable errors at the output.

One implementation of IDCT block 410 which maintains full MPEG compliance while requiring only 12 bits for initial coefficients in sign+magnitude format and similarly reduced numbers of intermediate value representation bits throughout, is described in U.S. patent application Ser. No. 08/904,085 (LSI Logic Dkt#: P- 3149) entitled "MPEG decoding system meeting 2-frame store and letterboxing requirements" and filed Jul. 31, 1997 by inventors Surya Varanasi, Satish Soman, and Tai Jing. MPEG compliance of a proposed IDCT block 410 implementation is established using IEEE Standard 1180-1990. These references are hereby incorporated by reference. The advantage of achieving compliance with reduced numbers of representation bits is that the multiply and add operations of the IDCT block 410 can be implemented using smaller, faster, and less costly multipliers and adders.

Since a reduced number of bits are required by the IDCT block 410, the implementation of the preceding module, inverse quantization block 408, may also be advantageously modified.

Figure 5:
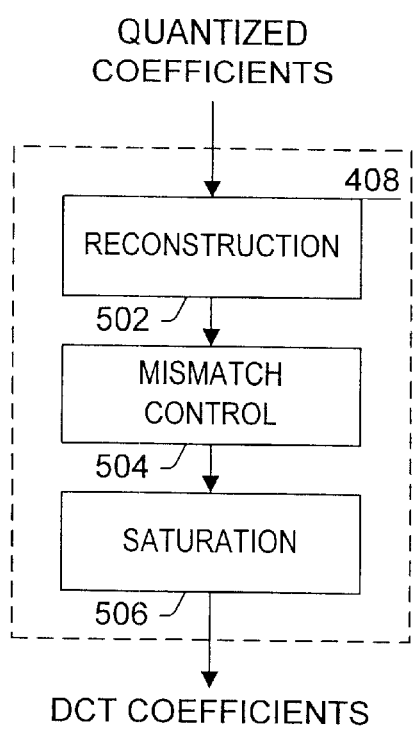
FIG. 5 is a functional block diagram of one inverse quantizer embodiment.
Figure 6:
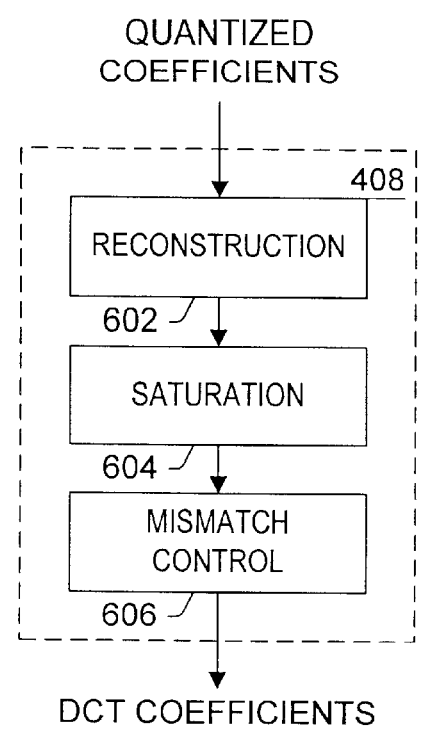
FIG. 6 is a functional block diagram of a second inverse quantizer embodiment.

The MPEG-1 and MPEG-2 standards specify slightly different inverse quantization operations, which are shown in FIGS. 5 and 6, respectively. FIG. 5 shows an inverse quantization block 408 for MPEG-1 which includes a reconstruction block 502, a mismatch control block 504, and a saturation block 506. Reconstruction block 502 re-scales the quantized coefficients to approximate their original, unquantized values. Reconstruction block 502 receives quantized coefficients QF[v][u] (where v and u are the row and column indices of the quantized coefficient matrix) and implements the equation (from the MPEG-1 standard):

$$F''[v][u] = \frac{(2 \times QF[v][u]) \times W[w][v][u] \times q}{16},$$

where W[w] is the quantization matrix determined by the zigzag scan order w, and q is a quantizer scale value.

The image reconstructions of different decoders will begin to diverge over time since their respective IDCT designs will reconstruct occasional, slightly different image blocks. Mismatch control block 504 attempts to reduce mismatches (IDCT output bit errors) between different IDCT algorithms by eliminating bit patterns which statistically have the greatest contribution towards mismatches between the various methods. Mismatch control block 504 implements MPEG-1's "oddification" control method since it forces the coefficients to odd values by reducing the magnitude of even values by one. In equation form:

$$F'[v][u] = \begin{cases} F''[v][u], \text{ if } F'[v][u] \text{ is odd} \\ F''[v][u] - k, \text{ if } F''[v][u] \text{ is even} \end{cases}$$

where k is the sign(F"[v][u]).

The scaling process may result in DCT coefficients which are outside the permissible range of [−2048,2047]. Saturation block 506 limits the DCT coefficients to the permissible range by "saturating", i.e. replacing values outside this range with the closest extreme value. In equation form:

$$F[v][u] = \begin{cases} 2047 & F'[v][u] > 2047 \\ F'[v][u] & -2048 \le F'[v][u] \le 2047 \\ -2048 & F'[v][u] < -2048 \end{cases}.$$

FIG. 6 shows an inverse quantization block 408 for MPEG-2 which includes a reconstruction block 602, a saturation block 604, and a mismatch block 606. The reconstruction block 602 implements the equation (from the MPEG-2 standard):

$$F''[v][u] = \frac{(2 \times QF[v][u] + k) \times W[w][v][u] \times q}{32},$$

where k is 0 for intraframe coded blocks, and is the sign(QF[v][u]), i.e. +1, 0, or −1 depending on whether QF[v][u] is greater than, equal to, or less than zero, respectively, for interframe coded blocks. The saturation block 604, although located differently, implements the same function as saturation block 506:

$$F'[v][u] = \begin{cases} 2047 & F''[v][u] > 2047 \\ F''[v][u] & -2048 \leq F''[v][u] \leq 2047 \\ -2048 & F''[v][u] < -2048 \end{cases}.$$

The mismatch control block 606 implements a different mismatch control method known as "LSB toggling" which affects only the least significant bit of the last (highest frequency) DCT coefficient. In this method, the sum of the DCT coefficients is made odd by toggling the least significant bit of the last DCT coefficient if the sum is even. This assumes that the coefficient is in 2's complement form. If the coefficient is in sign+magnitude form, the operation may be carried out by adding or subtracting 1 according to the following equation:

$$F[7][7] = \begin{cases} F'[7][7] & \sum_{v=0}^{7}\sum_{u=0}^{7} F'[u][v] \text{ is odd} \\ F'[7][7] - 1 & \text{sum is even and } F'[7][7] \text{ is odd} \\ F'[7][7] + 1 & \text{sum is even and } F'[7][7] \text{ is even} \end{cases}.$$

Figure 7:
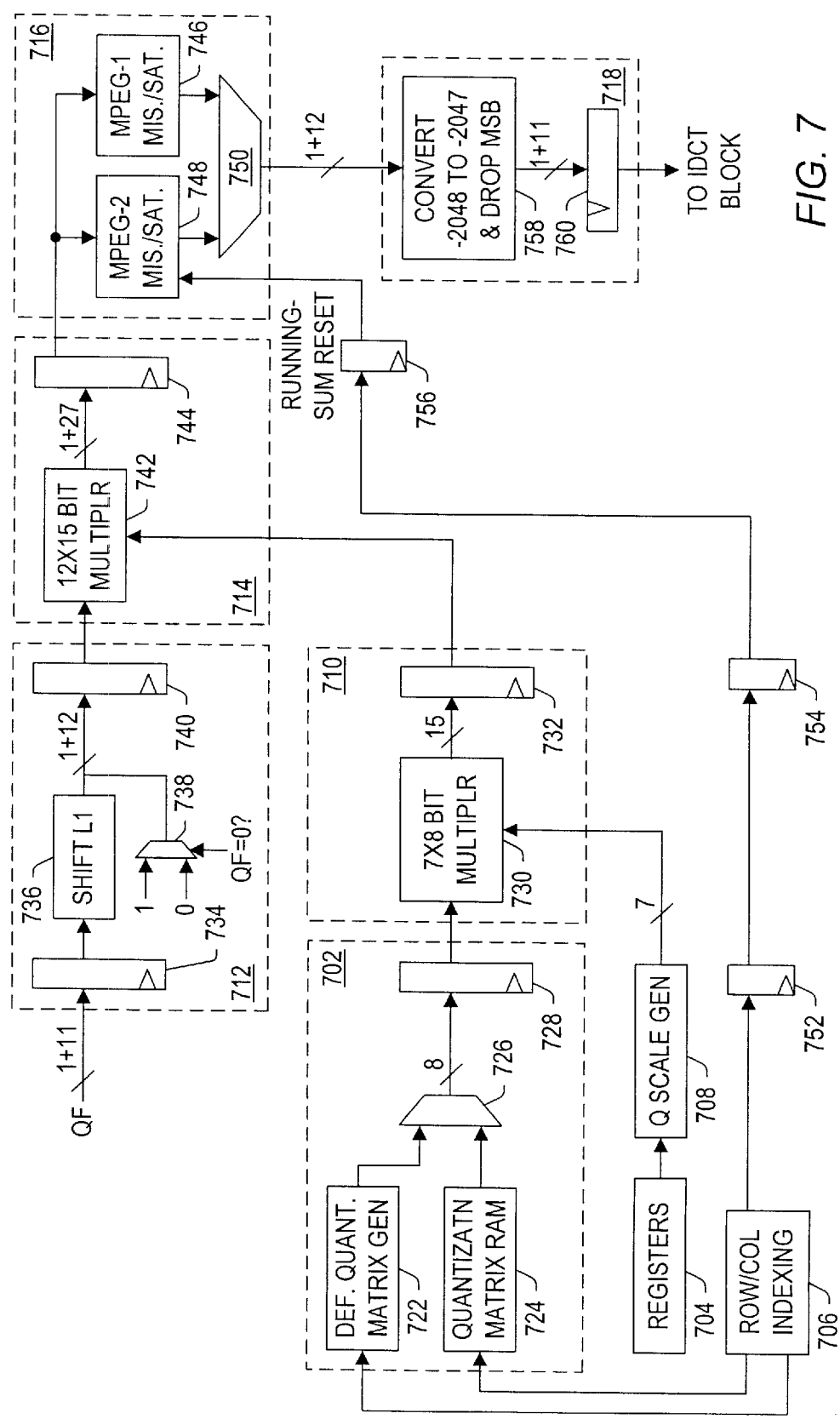
FIG. 7 is a schematic block diagram of one implementation of an inverse quantizer.

FIG. 7 shows a block diagram of an inverse quantization block 408 which comprises quantization matrix block 702, configuration registers 704, indexing block 706, quantization scale generator 708, scale multiplier 710, dead-zone expander 712, quantization multiplier 714, mismatch controller 716, bit reduction block 718, and delay latches 752, 754, and 756. Quantization matrix block 702 includes a default quantization matrix generator 722, a quantization matrix memory 724, a multiplexer 726, and a latch 728. Processor 302 programs the quantization matrix memory 724 with quantization matrix data from the bitstream, if available, and initializes configuration registers 704 with decoding option flags. Once the configuration registers are set, row/column indexing block 706 begins signaling the delivery of quantization matrix entries from generator 722 or memory 724 in synchronization with incoming quantized coefficients QF. A multiplexer 726 is set according to the configuration register to forward the entries from either the generator 722 or the memory 724 to latch 728.

Scale factor generator 708 generates a 7-bit constant quantization matrix scale factor according to the settings in the configuration registers 704. Scale multiplier 710 includes a 7×8 bit multiplier 730 to multiply the quantization matrix entries from latch 728 by the constant quantization matrix scale factor. The 15-bit output of multiplier 730 is latched by latch 732. It is noted that matrix entries and scale factor are always positive, so no sign bit is included.

Quantized coefficients are provided to dead-zone expander 712 in sign+magnitude form, i.e. one sign bit and the remaining bits representing the magnitude of the number. This is usually denoted using 1+m notation, where the 1 represents the sign bit and the m indicates the number of magnitude bits. Dead-zone expander 712 receives 1+11 bit quantized coefficients at a latch 734. The quantized coefficients are left-shifted (736) by one bit, which is effectively a multiplication by 2, and a least significant bit is appended from a multiplexer 738. For MPEG-2 interframe coded blocks, the appended least significant bit is a 1 unless the quantized coefficient is equal to zero. For all other cases, the appended bit is a 0. Since the LSB would otherwise be zero due to the left shift, the append operation effectively carries out an addition. The result is latched by latch 740.

Quantization multiplier 714 includes a 12×15 bit multiplier 742 which receives the 1+12 bit result from latch 740 and multiplies it by the 15 bit scale value from latch 732 to produce a 1+27 bit reconstructed DCT coefficient value. The reconstructed DCT coefficient value is latched by latch 744, and subsequently processed by mismatch controller 716.

Mismatch controller 716 comprises an MPEG-1 data path 746, an MPEG-2 data path 748, and a multiplexer 750 to select between their outputs. In one embodiment, the MPEG-1 data path 746 truncates the fractional portion (4 bits) of the reconstructed DCT coefficient value, and checks if any of the 12 most significant bits are nonzero to determine if the magnitude of the reconstructed DCT coefficient value is greater than or equal to 2048. If not, the eleven most significant bits are truncated, and the data path 746 adds negative one to the remaining magnitude bits if the least significant bit is zero, and the result is provided with the sign bit as the output of the data path 746. If the magnitude of the reconstructed DCT coefficient value is greater than or equal to 2048, then −2048 or 2047 is provided as the output of the data path 746, depending on the value of the sign bit.

In one embodiment, MPEG-2 data path 748 truncates the fractional portion (5 bits) of the reconstructed DCT coefficient value, and checks if any of the 11 most significant bits are nonzero to determine if the magnitude is greater than or equal to 2048. If so, the magnitude bits are replaced with 2048 or 2047, depending on the value of the sign bit, and provided to the next stage. Otherwise, the ten most significant bits are truncated and the remaining magnitude bits are provided with the sign bit to the next stage. The next stage simply passes the sign and magnitude bits to the output of data path 748, keeping a 1-bit running sum of the least significant bits of all the reconstructed DCT coefficients in this block using an XOR gate. Depending on the running sum and the last DCT coefficient, the last coefficient has 1 added or subtracted before being passed to the output of data path 748. The sum is reset to zero before the beginning of the next block. A reset signal which marks the last DCT coefficient and triggers the reset is provided from indexing block 706 via latches 752, 754, and 756.

The multiplexer 750 forwards the output from one of the data paths 746, 748 to bit reduction block 718. Block 718 includes a data path 758 and an output latch 760. Data path 758 checks to determine if the most significant magnitude bit is nonzero, and if so, replaces the remaining magnitude bits with 1's. The most significant magnitude bit is then discarded, and the resulting 1+11 bits provided to the output latch 760. In this manner, the number of output bits from the inverse quantizer 408 is advantageously reduced.

Numerous variations and modifications will become apparent to those skilled in the art once the above disclosure is fully appreciated. It is intended that the following claims be interpreted to embrace all such variations and modifications.

What is claimed is:

1. A video decoder which satisfies IEEE Standard 1180-1990 while having a reduced implementation complexity, wherein the video decoder comprises:

a VLC (variable length code) decoder configured to receive an encoded slice of macroblocks, and configured to decode the encoded slice of macroblocks into a sequence of quantized coefficient groups;

an inverse zigzag circuit coupled to receive the sequence of quantized coefficient groups from the VLC decoder and configured to reorder elements of the quantized coefficient groups to form a sequence of quantized coefficient matrices;

an inverse quantizer coupled to receive the sequence of quantized coefficient matrices from the inverse zigzag circuit and configured to individually scale elements of the quantized coefficient matrices to form a sequence of DCT (discrete cosine transform) coefficient matrices, wherein each element of the DCT matrices is represented using sign+magnitude form with only eleven magnitude bits.

2. The video decoder of claim 1, wherein the inverse quantizer includes:

a dead-zone expansion block configured to receive the sequence of quantized coefficient matrices and configured to append a bit to each element of the quantized coefficient matrices, wherein the appended bit is nonzero for nonzero elements and zero for zero-valued elements.

3. The video decoder of claim 2, wherein the inverse quantizer further includes:

a quantization multiplier configured to receive the elements with appended bits and configured to multiply the elements with appended bits by corresponding scaled quantization matrix elements to produce reconstructed DCT coefficients; and a data path configured to modify the reconstructed coefficients to limit the reconstructed coefficients to a range from −2048 to 2047, inclusive, and configured to calculate for each DCT coefficient matrix a 1-bit running sum of least significant bits of all reconstructed DCT coefficients, wherein the data path is further configured to alter a least significant bit of the last reconstructed DCT coefficient if the running sum is even.

4. The video decoder of claim 3, wherein the quatization multiplier is configured to multiply 1+12 bit element values by 15 bit scaled quantization matrix element magnitudes, and thereafter configured to truncate five least significant bits.

5. The video decoder of claim 3, wherein the inverse quantizer further includes:

a bit reduction circuit configured to receive the modified reconstructed coefficients from the data path and configured to determine if a most significant magnitude bit is nonzero, wherein if the most significant magnitude bit is nonzero, the bit reduction circuit is configured to replace all remaining magnitude bits with ones, and wherein the bit reduction circuit is further configured to drop the most significant magnitude bit from the modified reconstructed coefficients to produce reduced bit-width DCT coefficients, wherein the reduced bit-width DCT coefficients are provided as elements of a sign bit with the remaining magnitude bits as elements of the DCT coefficient matrices.

6. The video decoder of claim 5, further comprising:

an inverse DCT circuit coupled to receive the sequence of DCT coefficient matrices from the inverse quantizer and configured to convert the sequence of DCT coefficient matrices into a sequence of image difference blocks.

7. The video decoder of claim 6, wherein the VLC decoder is further configured to decode the encoded slice of macroblocks to produce a sequence of motion vectors, and wherein the video decoder further comprises:

a motion compensator coupled to receive the sequence of motion vectors from the VLC decoder and configured to retrieve a reference image block for each motion vector to produce a sequence of reference image blocks; and a combiner coupled to receive the sequence of image difference blocks from the inverse DCT circuit, coupled to receive the sequence of reference image blocks from the motion compensator, and configured to combine the sequences to form a sequence of decoded image blocks.

* * * * *